No. 847,612. PATENTED MAR. 19, 1907.
G. G. SCHROEDER.
COMBINATION CEMENT AND METAL FENCE POST.
APPLICATION FILED FEB. 28, 1906.
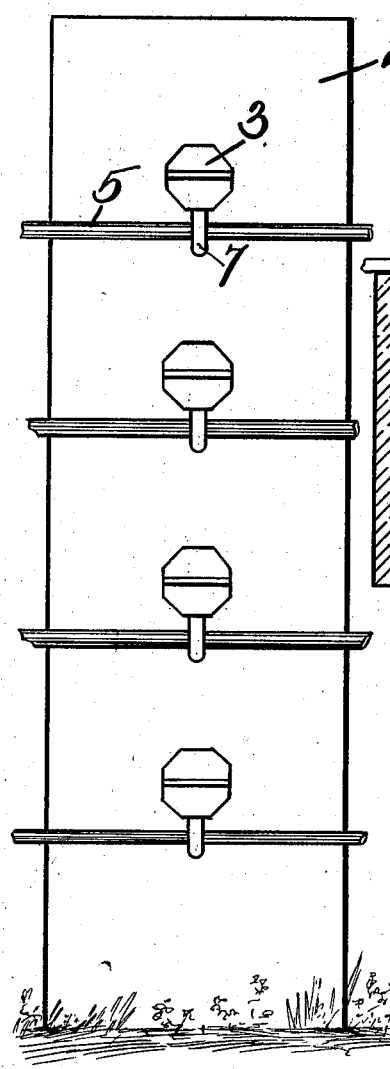
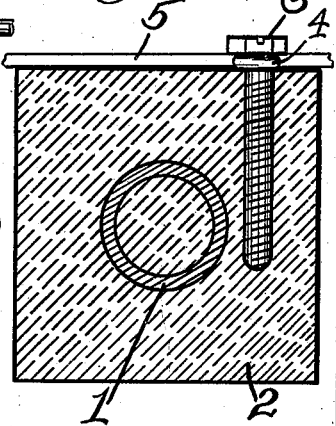
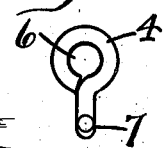
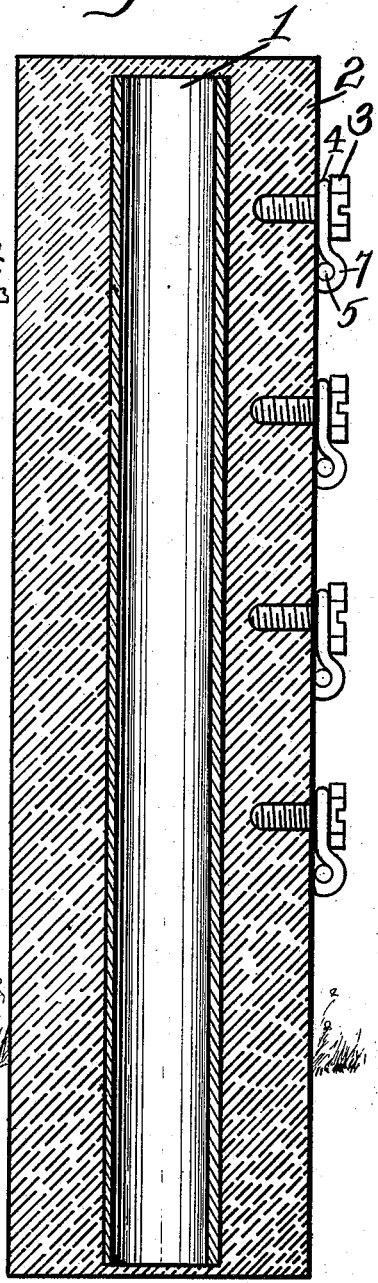
WITNESSES
F. Liebschutz
Thomas Drury
INVENTOR
George G. Schroeder

UNITED STATES PATENT OFFICE.

GEORGE G. SCHROEDER, OF WASHINGTON, DISTRICT OF COLUMBIA.

COMBINATION CEMENT AND METAL FENCE-POST.

No. 847,612.   Specification of Letters Patent.   Patented March 19, 1907.

Application filed February 28, 1906. Serial No. 303,377.

*To all whom it may concern:*

Be it known that I, GEORGE G. SCHROEDER, a citizen of the United States, residing at Washington, in the District of Columbia, have invented new and useful Improvements in a Combination Cement and Metal Fence-Post, of which the following is a specification.

This invention has relation to combination cement and metal fence-posts; and it consists in the novel construction and arrangement of its parts, as hereinafter shown and described.

The object of the invention is to provide a post especially adapted to be used in fencing and which is made up of a metal core covered with cement or other suitable plastic material. The post may be either square or round in cross-section or it may be in any other desired form. The core may be solid and cylindrical in cross-section or hollow cylindrical. Also suitable and novel means is provided for attaching wire fencing to the post, as will be hereinafter fully described.

The prime object of the invention is to provide a post which is simple and cheap in construction, one which is strong and rigid and which is lasting by reason of the fact that all metal parts are preserved from atmospheric and other elements by a sufficiently thick coat of cement or plastic material.

In the accompanying drawings, Figure 1 is a side elevation of a cement and metal fence-post which is square in cross-section. Fig. 2 is a cross-sectional view of the post as shown in Fig. 1. Fig. 3 is a vertical sectional view of a round fence-post having a hollow cylindrical core. Fig. 4 is a side elevation of a screw used for attaching the wire fencing to the post. Fig. 5 is a side elevation of a clip used for engaging the line-wires of the fencing. Fig. 6 is an edge elevation of the said clip.

In the form of the invention as shown in Figs. 1 and 2 the post is square in cross-section. The metal core 1 is located in the center of the post and is completely enveloped by the cement or plastic material 2. The said metal core 1 may be hollow and cylindrical, as shown in Fig. 2, and the cement material 2 may be filled into the interior of the said core, as shown in the said figure, if so desired. By reference to Fig. 2 it will be observed that the wire-securing screw 3 is located to one side of the central longitudinal axis of the post. By so locating the said screws long screws may be used, as their inner ends may pass along and even beyond the central metal core 1.

In the form of the invention as shown in Fig. 3 the post is round in cross-section. The metal core 1 is cylindrical and preferably hollow without cement filling, as shown in Fig. 3. In this form of the invention the screws 3 are located along the central longitudinal axis of the post, and consequently are short, as indicated in Fig. 3.

As shown in detail in Figs. 5 and 6, a wire clip 4 is provided for securing the line-wires of the fencing 5 to the screws 3. The said clip consists of the eye 6, through which the screw 3 is adapted to pass, and the depending tang 7, which is adapted to receive the line-wire 5 and bind the same against the post when the screw 3 is tightened. The tang 7 extends in a plane at right angles to that of the eye 6 and is suitably curved to receive the line-wire 5.

In all the forms of the invention the metallic core is placed in a suitable mold and the cement, grouting, or other plastic material is filled in about the core and is tamped down. The material is then permitted to rest until the plastic material hardens, when the completed post is removed from the mold and is ready for use.

Having described my invention, what I claim as new, and desire to secure by Letters Patent, is—

A post of the character as described consisting of a metallic core and a coating of plastic material completely enveloping the same, a wire-securing screw adapted to enter the said plastic material, and a clip having an eye through which said screw passes, and a tang adapted to receive and bind the wire against the post.

In testimony whereof I have signed my name to this specification in the presence of two subscribing witnesses.

GEORGE G. SCHROEDER.

Witnesses:
G. BEALE BLOOMER,
ALLISON N. LEAPLEY.